United States Patent [19]

Lewis, Jr. et al.

[11] Patent Number: 4,566,028

[45] Date of Patent: Jan. 21, 1986

[54] DIGITAL SIGNAL PROCESSING APPARATUS FOR PROCESSING DITHERED DIGITAL SIGNALS

[75] Inventors: Henry G. Lewis, Jr., Hamilton Square; Thomas V. Bolger, Merchantville, both of N.J.

[73] Assignee: RCA Corporation, Princeton, N.J.

[21] Appl. No.: 498,102

[22] Filed: May 25, 1983

[51] Int. Cl.$^4$ ............................................. H04N 11/04
[52] U.S. Cl. ..................................... 358/21 R; 358/13
[58] Field of Search .................................... 358/13, 21

[56] References Cited

U.S. PATENT DOCUMENTS

| 4,275,411 | 6/1981 | Lippel | 358/13 |
| 4,317,129 | 2/1982 | Favreau | 358/13 |
| 4,334,237 | 6/1982 | Reitmeier et al. | 358/36 |
| 4,352,123 | 9/1982 | Flamm | 358/23 |

OTHER PUBLICATIONS

A. Goldberg, "PCM Encoded NTSC Color Television Subjective Tests", *Journal of the SMPTE*, vol. 82, Aug. 1973, pp. 649–654.

V. Devereux, "Application of PCM To Broadcast Quality Video Signals", *The Radio and Electronic Engineer*, vol. 44, No. 7, Jul. 1974, pp. 373–381.

ITT Semiconductors, *VLSI Digital TV System DIGIT 2000*, Aug. 1982.

Primary Examiner—John W. Shepperd
Attorney, Agent, or Firm—Eugene M. Whitacre; Paul J. Rasmussen; Clement A. Berard, Jr.

[57] ABSTRACT

In a digital signal processing system, an analog-to-digital converter producing digital representations of an analog signal is dithered to increase its apparent quantizing resolution. Certain processing of the digital signals, however, can result in the loss of the dither information, because of either the form of digital filtering employed or the number of bits of the digital signals processed. To avoid the effects of such loss, the least significant bit of the digital signals is delayed and is applied to an analog output device to reintroduce a dither signal thereat having a magnitude substantially equivalent to that of the lost bit. The present invention is useful in processing digital television signals in a television receiver having a digital signal processing section.

20 Claims, 4 Drawing Figures

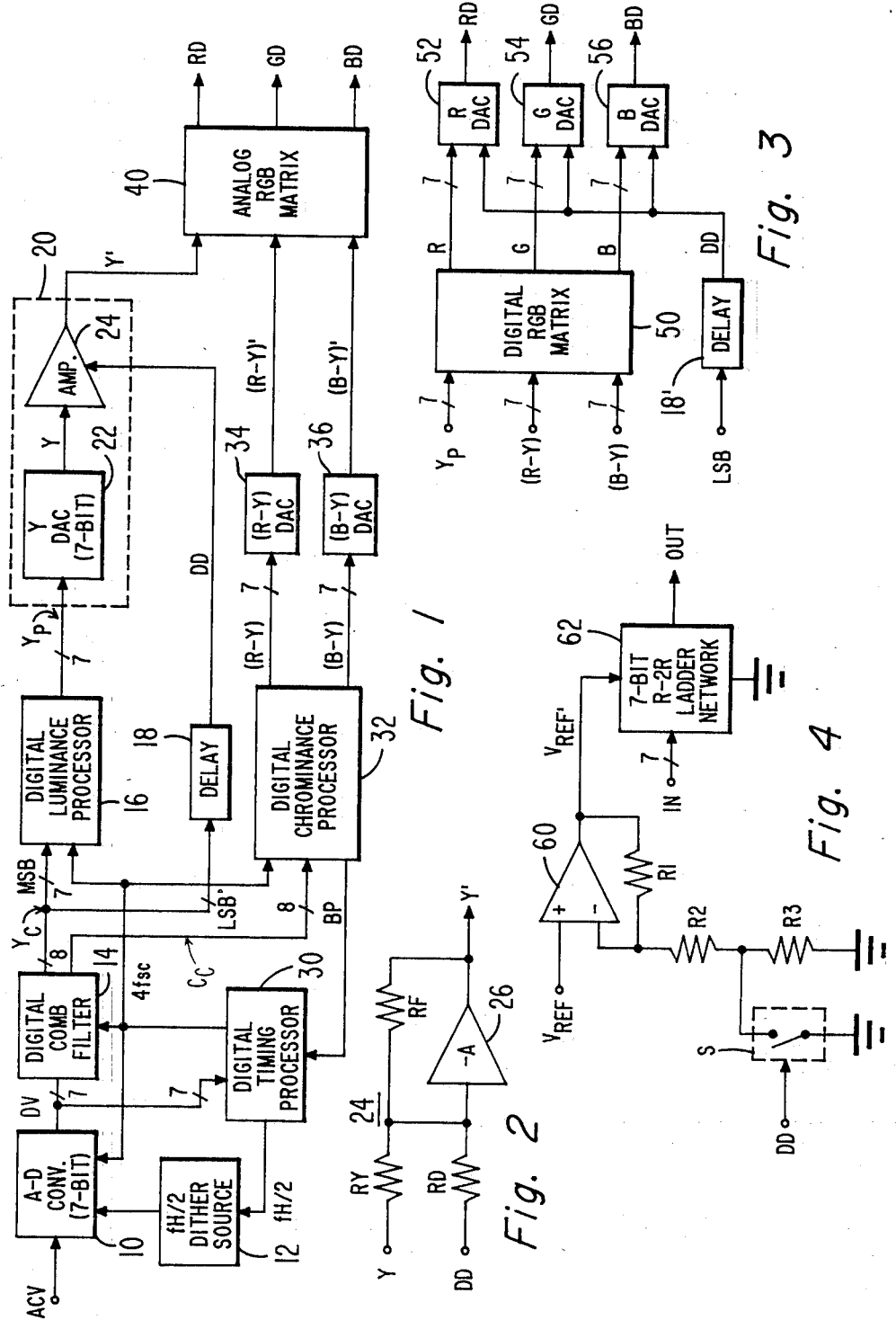

DIGITAL SIGNAL PROCESSING APPARATUS FOR PROCESSING DITHERED DIGITAL SIGNALS

The present invention relates to the processing of digital signals and particularly to the processing of digital signals including a dithering signal component. The present invention is useful in processing digital television signals in a television receiver.

The quantizing resolution of digital signals is primarily limited by the number of bits thereof produced by an analog-to-digital converter (ADC). In some applications, it is impractical to obtain the desired number of bits of resolution either because no such ADC is available to operate at the required conversion rate or because the available ADCs are too costly in relation to the maximum feasible cost of the end product. The latter is the case for television (TV) receivers because the piece-part cost of a presently available eight-bit ADC operable at conversion rates of 14–18 MegaHertz (MHz) is nearly the same as the retail price of the entire TV receiver.

The above limitation can be overcome by employing a seven-bit ADC operable at 14–18 MHz in which the input analog signal is disturbed by a low-level signal, called a dither signal, so as to increase the apparent quantizing resolution to approximate that of an eight-bit ADC. Such arrangements are shown in U.S. Pat. Nos. 4,352,123 and 4,334,237, for example. The apparent increase in quantizing resolution is lost, however, where certain digital signal processing operations are performed. This loss arises, for example, where the dither signal component is removed by certain digital filtering operations or where the number of bits of the digital signals which are processed are inadequate to retain the extra information provided by the dither signal component.

This problem is aggravated by the reconversion of the digital signals back into analog signals because digital-to-analog converters (DAC) are subject to many of the same performance limitations encountered in ADCs. Presently available DACs for converting eight-bit digital television signals to analog signals at 14–18 MHz conversion rates remain complex and overly costly relative to the retail prices of TV receivers.

Thus, there is a need for arrangements to process digital signals such as those produced by a dithered ADC without significantly increasing the complexity of the digital signal processing apparatus and without creating the need for a high-speed, very accurate, and therefore costly, DAC.

Accordingly, the digital signal processing apparatus of the present invention comprises a source providing N-bit digital signals and a processor responsive to $N-1$ bits of the digital signals. The processed digital signals are converted into analog output signals and the least significant bit of the N bit digital signals is applied to change the magnitude of the analog output signals.

In the Drawing:

FIG. 1 is a schematic diagram in block diagram form of an arrangement including an exemplary embodiment of the present invention; and FIGS. 2, 3 and 4 are schematic diagrams, partially in block diagram form, of exemplary and alternative embodiments of portions of the arrangement of FIG. 1.

In the drawings, line arrows represent signal paths for analog signals or for single-bit or serial digital signals, and line arrows with slash marks represent signal paths for multiple-bit parallel digital signals having the number of bits indicated by the numeral or legend proximate the slash mark.

FIG. 1 shows a digital signal processing section of a TV receiver in which the present invention provides particular advantage. Analog composite video signals ACV, developed in conventional fashion, are applied to seven-bit analog-to-digital converter (ADC) 10 which produces corresponding seven-bit digital signals therefrom. Digital signals DV are produced at four-times the frequency $f_{sc}$ of the color subcarrier reference burst signal in response to sampling signal $4f_{sc}$. Dither signal source 12 applies a low-level dither signal to ADC 10 in response to clock signal $f_H/2$ to change the correspondence between the magnitude of the analog video signals ACV and that of digital video signals DV by a small amount at a predetermined rate. A change corresponding to the magnitude represented by one-half the least significant bit (LSB) of digital signals DV and at one-half the TV line rate $f_H$ is satisfactory.

Digital comb filter 14 receives digital signals DV and sampling signal $4f_{sc}$ to develop therefrom eight-bit digital luminance signals $Y_c$ and eight-bit digital chrominance signals $C_c$. Signals $Y_c$ and $C_c$ include at least one extra bit because comb filter 14 includes an accumulator or adder which combines several samples of digital signals DV. Such extra bits can be similarly produced by digital filters other than comb filters, such as low-pass, band-pass and high-pass FIR or IIR filters.

Digital luminance processor 16 receives only the seven most significant bits (MSB) of digital luminance signal $Y_c$ and is arranged to process seven-bit digital signals in response to sampling signal $4f_{sc}$ so as to avoid the added complexity and cost which would be necessitated to process eight-bit signals. As a result, any information represented by the least significant bit (LSB) of the signals $Y_c$ produced by comb filter 14 is lost. Digital luminance processor 16 performs operations such as filtering the luminance signals, peaking the digital luminance signals and multiplying the digital luminance signals to adjust the contrast level of the resulting picture. Luminance processor 16 produces processed seven-bit digital luminance signals $Y_p$ which are converted into corresponding analog luminance signals Y' by converting means 20 which includes seven-bit digital-to-analog converter (DAC) 22 and amplifier 24.

The analog luminance signals Y developed by DAC 22 are limited, however, to the seven-bit resolution (128 levels) of the digital luminance signals $Y_p$. This limitation is substantially overcome by the cooperation of delay 18 and amplifier 24 with DAC 22. The LSB of the filtered digital luminance signals $Y_c$ produced by digital filter 14 is applied to delay device 18 which is, for example, a one-bit shift register having a number of stages of delay selected to substantially equal the delay of the digital luminance signal path introduced by digital luminance processor 16 and DAC 22. Delay device 18 is clocked in response to sampling signal $4f_{sc}$. The delayed LSB signal DD is applied to analog amplifier 24 so as to change the magnitude of analog luminance signal Y by a small amount thereby to develop analog luminance signal Y'. The magnitude of this change is selected to substantially correspond to that which the LSB would have represented had it been processed through processor 16 and DAC 22.

It is important to note that whether or not the LSB signal causes a magnitude change of signals Y' is related to whether or not it represents information which should be processed and retained. If the LSB is zero valued, then the seven-MSB produced by digital filter 14 represents all the information-bearing bits so that analog signal Y produced by DAC 22 is not in need of modification and none is introduced into signal Y' by the LSB via amplifier 24. On the other hand, if the LSB is one valued, the seven-MSB signal is not entirely correct but the information represented by the LSB is introduced at the appropriate time via amplifier 24 to modify the magnitude of analog signal Y'.

An exemplary embodiment of amplifier 24 shown in FIG. 2 includes a high-gain inverting amplifier 26 connected as a negative feedback inverting amplifier. Analog luminance signals Y are scaled by the voltage gain equation Y'=[−RF/RY] Y, which is conveniently minus unity when the resistances of RF and RY are equal. Scaled luminance signals Y' are changed by the magnitude Y'=[−RF/RD] DD in response to delayed LSB signals DD, where in the equation DD represents the magnitude of the delayed LSB signal. Because only a small change in the magnitude of Y' is required in response to the delayed LSB signal (e.g. 1/256), the resistance of resistor RD is very large relative to that of RY. It is noted that the inversion introduced by amplifier 24 can be readily negated in the signal processing, by a second amplifier of minus unity gain, or by an alternate embodiment of amplifier 24 as a non-inverting amplifier. Owing to the cooperation of amplifier 24 and DAC 22, converting means 20 produces analog luminance signals Y' having approximately 256 levels rather than the 128 levels which could be provided by seven-bit DAC 22 alone.

Seven-bit digital chrominance signals $C_c$ are applied to digital chrominance processor 32 of FIG. 1 which performs operations such as band-pass filtering the chrominance component signals, automatic chrominance controlling to standardize the magnitude of the chrominance subcarrier signals, demodulating the (R-Y) and (B-Y) chrominance component signals and adjusting the magnitudes thereof to control saturation (color intensity) and hue (tint). Processor 32 receives sampling signal $4f_{sc}$ but, because the (R-Y) and (B-Y) signals are of less than 1.8 MHz bandwidth, performs certain processing at one-fourth that rate (i.e. at $f_{sc}$). The resulting digital chrominance component signals (R-Y) and (B-Y) are applied to DACs 34 and 36, respectively, which produce analog chrominance component signals (R-Y)' and (B-Y)', respectively. In addition, processor 32 detects the phase error between sampling signal $4f_{sc}$ and the color subcarrier reference burst signal component of the digital video signals to produce color reference burst phase error signals BP which are employed by timing processor 30 described below.

Analog RGB matrix 40 receives analog luminance signals Y' and analog chrominance signals (B-Y)' and (R-Y)' to develop therefrom analog color drive signals RD, GD and BD in accordance with the color balance equations of, for example, the NTSC system used in the United States. Drive signals RD, GD, and BD are applied to a kinescope (not shown) to create a color picture display thereon.

Seven-bit digital samples DV are applied to digital timing processor 30 which develops the various clock and timing signals required to operate ADC 10, source 12, filter 14, processors 16 and 32, delay 18 and DACs 22, 34 and 36. Processor 30 includes, for example, a phase-locked loop having a voltage-controlled oscillator operating at the frequency of sampling signal $4f_{sc}$ and responsive to the burst phase error signal BP supplied by chrominance processor 32. Processor 30 is further responsive to the horizontal synchronization pulse represented in digital samples DV to develop a clocking signal at the horizontal line rate $f_H$. A digital divide-by-two circuit produces clocking signal $f_H/2$ therefrom.

FIG. 3 shows an alternative embodiment in which analog RGB matrix 40 and DACs 20, 34 and 36 are replaced by digital RGB matrix 50 and DACs 52, 54 and 56. Digital RGB matrix 50 includes a digital interpolator for increasing the data rate of the (R-Y) and (B-Y) digital signals up to the $4f_{sc}$ data rate of the $Y_p$ digital signals. Digital RGB matrix 50 further includes digital multipliers and adders to perform the calculations described by the NTSC system transformation equations for transforming digital luminance signals $Y_P$ and digital chrominance signals (R-Y) and (B-Y) into digital color signals R, G and B. Digital color signals R, G and B are respectively applied to DACs 52, 54 and 56 which respectively develop analog color drive signals RD, GD and BD therefrom.

The LSB signal bit of digital luminance signals $Y_c$ is applied to delay device 18' which is similar to delay device 18 except that the number of stages is selected to account for the processing delays of processors 16 and 32 and of digital matrix 50. Delayed LSB signal DD is applied to each of DACs 52, 54 and 56 to effect small magnitude changes in color drive signals RD, GD and BD analogously to that described above in relation to converter 20.

A satisfactory arrangement for effecting such small magnitude changes in response to delayed LSB signal DD is shown in FIG. 4. Non-inverting feedback amplifier 60 is arranged to scale DAC reference voltage VREF by the gain factor [1+R1/(R2+R3)] to produce reference voltage VREF' in accordance with the resistances of resistors R1, R2 and R3. Controllable switch S is coupled across R3 to remove the effect of resistance R3 from the above gain factor in response to delayed LSB signal DD. The resistance of R3 is very much smaller than that of R2 (e.g. 1/256) so as to provide the appropriately small change in VREF'.

Seven-bit R-2R resistive ladder network 62 responds to seven-bit digital signals at input IN and to VREF' thereby forming a multiplying DAC producing analog output signals at terminal OUT. A separate ladder network 62 is required for each of DACs 52, 54 and 56 to which reference voltage VREF' is applied in common.

Modifications are contemplated to the present invention within the scope of the claims following. For example, the arrangement of FIG. 4 can be employed in place of the converter 20 described in relation to FIG. 1. Alternatively, DACs 52, 54 and 56 can receive a fixed reference voltage VREF and can be coupled to respective post-amplifiers of the sort shown in FIG. 2.

The apparatus described herein including ADC 10, source 12, processors 16,30,32, DACs 22,34,36 and matrix 40 can correspond, for example, to digital signal processing integrated circuits for television receivers available from ITT Semiconductors, Intermetall, Freiburg, West Germany and described in an ITT Semiconductors brochure entitled VLSI Digital TV System DIGIT 2000, dated August 1982, which is incorporated herein by reference. In addition, U.S. Pat. No. 4,352,123 describing a dithered ADC and digital luminance and chrominance processing is also incorporated herein by reference.

What is claimed is:

1. Digital signal processing apparatus comprising:
   a signal source for providing digital input signals having N bits, where N is a positive integer;
   processing means, coupled to said signal source, for digitally processing said digital input signals to develop processed digital signals therefrom, wherein said processing means is responsive to less than N of the most significant bits of said digital input signals;
   first means, coupled to said processing means and including digital-to-analog converting means, for developing analog output signals representing the magnitude of said processed digital signals; and
   second means, coupled to said first means and to said signal source, for changing the correspondence between the magnitude of said analog output signals and the magnitude of said processed digital signals in response to the least significant bit of said digital input signals.

2. The apparatus of claim 1 wherein said second means comprises an analog signal combining means for proportionally combining said analog output signals developed by said first means and a signal responsive to said least significant bit.

3. The apparatus of claim 2 wherein said second means further comprises delaying means coupled to said signal source for delaying said least significant bit for temporally aligning said signal responsive to said least significant bit with said analog signal.

4. The apparatus of claim 1 wherein said first means includes a source for providing a reference level signal for said digital-to-analog converting means, and said second means comprises means coupled to said source and responsive to said least significant bit for changing the level of said reference level signal.

5. The apparatus of claim 4 wherein said second means includes a plurality of resistances coupled in series, and controllable switch means coupled across one of said resistances for selectively providing a conductive connection thereacross in response to said least significant bit.

6. Digital signal processing apparatus comprising:
   analog-to-digital converting means for developing N-bit digital signals representing the magnitude of samples of analog input signals applied thereto, where N is a positive integer;
   a signal source, coupled to said analog-to-digital converting means, for applying a periodic dither signal thereto to change the correspondence between the magnitude of said digital signals and the magnitude of said analog signals;
   first processing means, coupled to said analog-to-digital converting means, for digitally processing said digital signals to produce processed digital signals having at least N+1 bits;
   second processing means, coupled to said first processing means, for digitally processing said processed digital signals to produce output digital signals having no more than N bits;
   first means, coupled to said second processing means and including digital-to-analog converting means, for developing analog output signals representing the magnitude of said output digital signals;
   delaying means, coupled to said first processing means, for delaying the least significant bit signals of said N+1 bit processed digital signals; and
   second means, included in said first means and coupled to said delaying means, for changing the correspondence between the magnitude of said analog output signals and the magnitude of said output digital signals in response to said delayed least significant bit signals.

7. The apparatus of claim 6 wherein said second means comprises an analog signal combining means for proportionally combining said analog output signals developed by said digital-to-analog converting means and said delayed least significant bit signals.

8. The apparatus of claim 6 wherein said first means includes a source for providing a reference level signal for said digital-to-analog converting means, and said second means comprises means for coupling said reference level signal to said digital-to-analog converting means and responsive to said delayed least significant bit signals for changing the level of said reference level signal.

9. The apparatus of claim 8 wherein said coupling means includes a plurality of resistances coupled in series, and controllable switch means coupled across one of said resistances for selectively providing a conductive connection thereacross in response to said least significant bit.

10. Digital signal processing apparatus for a television receiver comprising:
    a source of digital luminance signals having N bits and of digital chrominance signals, where N is a positive integer;
    luminance processing means, coupled to said source, for digitally processing said digital luminance signals to develop processed digital luminance signals therefrom, wherein said luminance processing means is responsive to less than N of the most significant bits of said digital luminance signals;
    chrominance processing means, coupled to said source, for digitally processing said digital chrominance signals to develop processed digital chrominance signals therefrom;
    converting means, coupled to said luminance and chrominance processing means, for developing analog color signals responsive to said processed digital luminance signals and to said processed digital chrominance signals, and including means, coupled to said source and responsive to the least significant bit of said digital luminance signals, for changing the correspondence between the magnitude of said analog color signals and the magnitudes of said processed digital luminance and digital chrominance signals in accordance with said least significant bit.

11. The apparatus of claim 10 wherein said converting means includes delaying means, coupled to said source, for delaying said least significant bit, and wherein said means for changing is responsive to said delayed least significant bit.

12. The apparatus of claim 10 wherein said converting means comprises first and second digital-to-analog converting means for developing analog luminance signals and analog chrominance signals representing the magnitudes of said processed digital luminance signals and said processed digital chrominance signals, respectively, wherein said means for changing is coupled to at least one of said first and second digital-to-analog converting means for changing said correspondence in accordance with said least significant bit.

13. The apparatus of claim 12 wherein said means for changing comprises an analog signal combining means for proportionally combining the one of said analog luminance and chrominance signals developed by said one of said first and second digital-to-analog converting means and said least significant bit.

14. The apparatus of claim 12 wherein said converting means includes a source for providing a reference level signal for said one of said digital-to-analog converting means, and said means for changing comprises means for coupling said reference level signal to said one of said digital-to-analog converting means and is responsive to said least significant bit for changing the level of said reference level signal.

15. The apparatus of claim 14 wherein said coupling means includes a plurality of resistances coupled in series, and controllable switch means coupled across one of said resistances for selectively providing a conductive connection thereacross in response to said least significant bit.

16. The apparatus of claim 12 wherein said converting means further comprises analog matrixing means for combining said analog luminance signals and analog chrominance signals to develop said analog color signals.

17. The apparatus of claim 10 wherein said converting means comprises:
digital matrixing means, coupled to said luminance processing means and to said chrominance processing means, for combining said processed digital luminance signals and said processed chrominance signals to developing digital color signals; and
digital-to-analog converting means, coupled to said digital matrixing means, for developing said analog color signals representing the magnitudes of said digital color signals, wherein said means for changing is coupled to said digital-to-analog converting means for changing said correspondence in accordance with said least significant bit.

18. The apparatus of claim 17 wherein said means for changing comprises an analog signal combining means for proportionally combining said analog color signals developed by said digital-to-analog converting means and said least significant bit.

19. The apparatus of claim 17 wherein said converting means includes a source for providing a reference level signal to said digital-to-analog converting means, and said means for changing comprises means for coupling said reference level signal to said digital-to-analog converting means and is responsive to said least significant bit for changing the magnitude of said reference level signal.

20. The apparatus of claim 19 wherein said coupling means includes a plurality of resistances coupled in series, and controllable switch means coupled across one of said resistances for selectively providing a conductive connection thereacross in response to said least significant bit.

* * * * *